United States Patent [19]
Shimoji

[11] Patent Number: 6,130,902
[45] Date of Patent: Oct. 10, 2000

[54] SOLID STATE LASER CHIP

[76] Inventor: Yutaka Shimoji, 2125 University Ct., Clearwater, Fla. 34624

[21] Appl. No.: 09/085,326

[22] Filed: May 26, 1998

[51] Int. Cl.[7] ............................................... H01S 3/04
[52] U.S. Cl. ......................................................... 372/34
[58] Field of Search ................................. 372/21, 22, 34, 372/35, 36

[56] References Cited

U.S. PATENT DOCUMENTS

| | | | |
|---|---|---|---|
| 4,644,550 | 2/1987 | Csery | 372/40 |
| 4,847,851 | 7/1989 | Dixon | 372/75 |
| 4,872,177 | 10/1989 | Baer | 372/75 |
| 5,008,895 | 4/1991 | Martin | 372/69 |
| 5,114,236 | 5/1992 | Matsugu | 356/401 |
| 5,256,164 | 10/1993 | Mooradian | 29/25.02 |
| 5,377,212 | 12/1994 | Tatsuno et al. | 372/22 |
| 5,414,724 | 5/1995 | Zhou et al. | 372/10 |
| 5,497,387 | 3/1996 | Okazaki | 372/21 |
| 5,651,022 | 7/1997 | Anthon et al. | 372/92 |
| 5,838,713 | 11/1998 | Shimoji | 372/92 |
| 5,854,802 | 12/1998 | Jin | 372/22 |
| 5,898,718 | 4/1999 | Mohatt | 372/22 |
| 5,928,220 | 7/1999 | Shimoji | 606/2 |
| 5,995,523 | 11/1999 | Xie | 372/22 |
| 6,026,101 | 2/2000 | Suzudo | 372/22 |
| 6,026,102 | 2/2000 | Shimoji | 372/22 |

*Primary Examiner*—Frank G. Font
*Assistant Examiner*—Gioacchino Inzirillo

[57] ABSTRACT

A laser amplification system includes a pumping diode laser, a gain laser crystal, a moveable wedged shaped etalon for wavelength selection, a non-linear crystal for wavelength conversion, such that each optical component has independent temperature control means. A single mode operation is achieved of up to 100 Watts output power with a minimum noise by stabilizing the optimum temperature of the optical media and the optical pathlength of the etalon. All components are disposed on a single metal substrate having a high thermal conductivity and a low thermal expansion coefficient. The system operates to amplify a laser from another source with high efficiency and low noise when the etalon and nonlinear crystal are absent.

20 Claims, 3 Drawing Sheets

SOLID STATE LASER CHIP

BACKGROUND

The present invention relates to a small solid state laser/amplifier system built on a single metal substrate.

Tatsuno et al. explain in U.S. Pat. No. 5,377,212 that the refractive index of laser crystal media and, therefore, the retardation and wavelength selection changes with temperature. It is disclosed that retardation has been controlled by using a Peltier cooler to control the temperature of a nonlinear crystal against a given crystal length. A slant in the end face of a nonlinear crystal is shown to change the thickness and therefore the retardation depending on the route of passage of the fundamental wave.

Martin in U.S. Pat. No. 5,008,895 shows a flat metal one-piece package with a lid and an attached thermoelectric cooler. Mooradian discloses in U.S. Pat. No. 5,256,164 a solid state laser in which the gain medium is tuned by several temperature regulating elements to select a single wavelength. Dixon disclosed in U.S. Pat. No. 4,847,851 the use of reflective and anti-reflective coatings on laser media. A single heat sink is used to mount all the laser components in thermal contact with a single thermoelectric cooler. Okazaki discloses in U.S. Pat. No. 5,497,387 a wedge shaped etalon fixed in position on a thermoelectric cooler which sets the resonator mode at the temperature of maximum lasing efficiency. This is taught to prevent noise due to mode competition.

None of the prior art disclose separate thermoelectric coolers for each laser crystal medium for independent temperature regulation of each crystal. A mobile etalon is not disclosed together with all the laser media including the pumping lasers to be mounted on a single metal substrate. The problem has been that not all of the various laser media can operate at their optimum efficiency temperatures.

So, there remains a need to provide a solid state laser/amplifier system that is efficient to mass produce with superior long-term reliability such that the various laser media are held at their respective temperatures of maximum lasing efficiency. There is also a need to provide a system which, when operating in the amplification mode, is capable of delivering greater output power with less noise.

SUMMARY

The main object of the inventive device is to provide a solid state laser/amplifier system having a single axial mode, single wavelength operation with output power of up to 100 Watts and with low noise. The second object is to provide a micro-laser chip that can be mass produced with high efficiency and that has a long-term, heavy duty reliability. The third object is to provide a means of generating a precisely controlled, single axial mode laser beam. The fourth object is to provide an amplifier to efficiently amplify a laser beam from another source with low noise.

These and other objects are achieved in the present inventive device by having each optical medium in thermal contact with separate thermoelectric coolers and sensors so that the temperature of optimum efficiency is maintained for each optical medium at a selected wavelength of laser light. A moveable wedge shaped etalon, one end face of which may be curved, is used to select the particular wavelength, and the optimum efficiency temperature is maintained for that wavelength. Amplification of laser light from another source is achieved by a diode laser pumped gain crystal without the etalon and nonlinear crystal in place. Efficient long-term, heavy-duty reliability is obtained by placing all of the laser components on a single metal substrate with a matching lid.

These and other objects of the invention will be more clearly understood from the following detailed description of the preferred embodiments when studied in light of the following appended drawings.

DETAILED DESCRIPTION OF THE PREFERRED EMBODIMENTS

Figure 1:
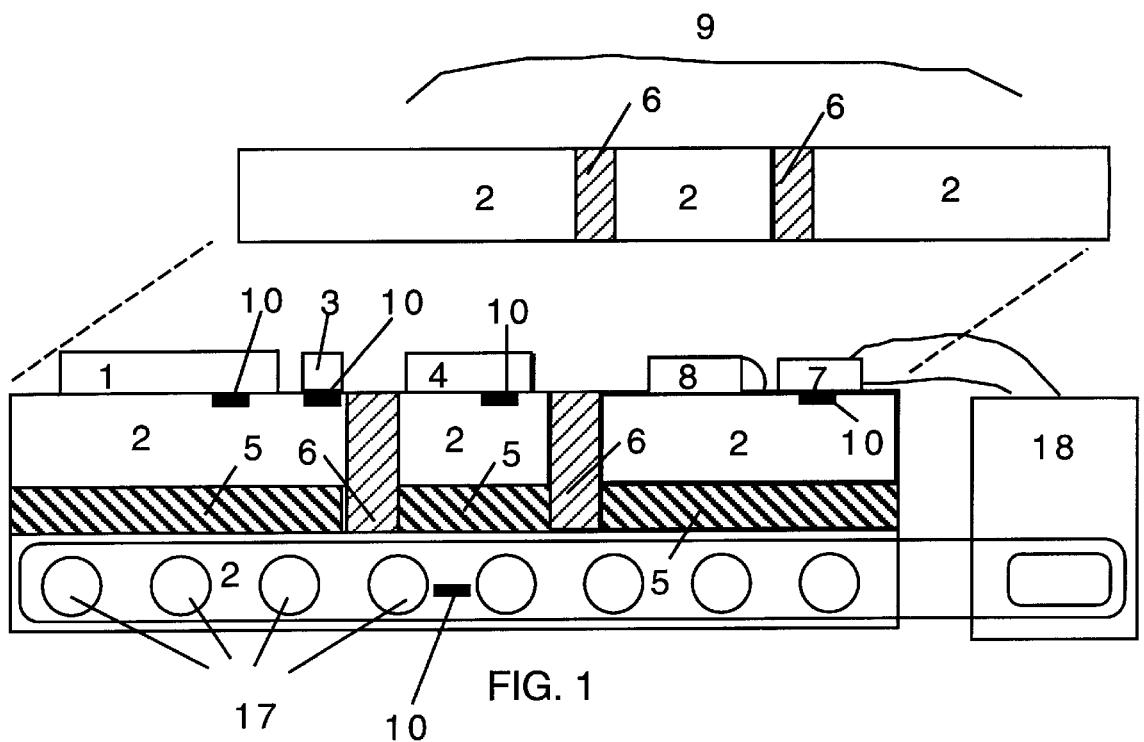
FIG. 1 is a cross sectional view of a solid state micro-laser/amplifier chip with the lid shown above it.
Figure 2:
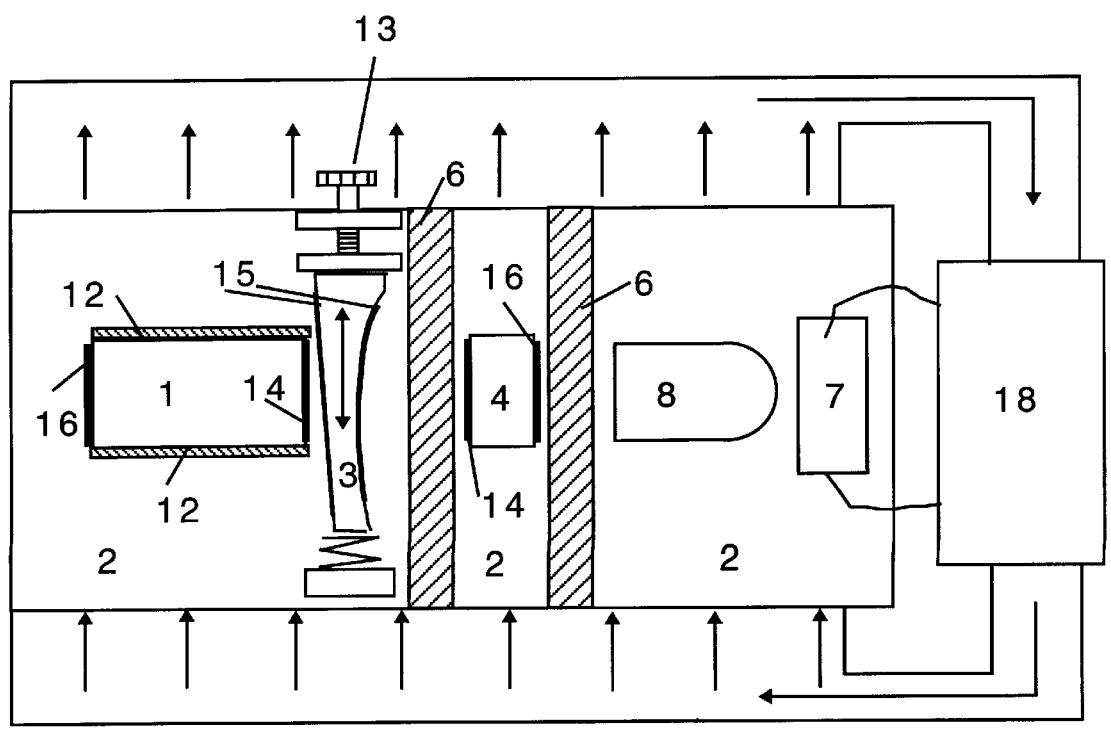
FIG. 2 is a top view of the chip shown in FIG. 1 showing the various laser components mounted on the metal substrate, and indicating the direction of movement of the moveable etalon and the coolant by arrows.

A solid state laser/amplification system operating in the laser generation mode is shown in FIGS. 1 and 2 having at least one nonlinear crystal 1, a moveable wedge shaped solid etalon 3, a gain crystal 4, a pumping diode laser crystal 7, and a lens 8, all mounted on a single metal substrate 2 which acts as a heat sink. The metal substrate 2 is made of a metallic substance that has a low coefficient of thermal expansion and a high thermal conductivity and made from a material chosen from the group of silicon carbide reinforced aluminum and iron-nickel alloy. On the metal substrate 2 there is a coating 11 having a higher thermal conductivity than the metal substrate 2 and is made of a material selected from the group of diamond, aluminum oxide, and gold. The pumping diode laser 7 and lens 8 are thermally isolated from the laser gain crystal 4 by a trough interposed between them in the metal substrate 2, and filled with a thermally insulative material 6. A trough containing insulative material 6 also thermally isolates the gain crystal 4 from the nonlinear crystal 1. The material of the metal substrate is also the material of the lid 9, which also contains the troughs filled with the insulative material 6, to further thermally isolate the pumping diode laser from the gain crystal and from the nonlinear crystal. The metal substrate 2 includes a liquid coolant circulation system 17, which is activated by a sensor 10 in the substrate 2 when the temperature of the substrate exceeds a chosen value, and which removes excess heat from the laser crystals and which also circulates the coolant through the pumping diode laser power supply 18 as indicated by the arrows in FIGS. 2, 4, and 6. There are at least two separate thermoelectric coolers 5 and at least two sensors 10, and optimally a separate thermoelectric cooler 5 and a separate sensor 10 for each laser component and for the pumping diode laser 7, as shown in FIGS. 1–4, which operate independently of each other sepatated by insulator-filled troughs 6 in a single metal substrate 2 to keep each laser crystal and the etalon 3 and the pumping diode laser 7 at their respective temperatures of optimum lasing efficiency.

The etalon 3 is shaped so that, as it is moved by a moving means 13 in the direction shown by the two headed arrow in FIG. 2, the optical thickness varies along the direction of laser light transmission. In one example the etalon 3 is wedge shaped. In another example the etalon 3 has at least one end face that is curved. In another example the wedge shaped etalon 3 has a curvature in at least one end face. One advantage provided by the curved etalon end face is a gradient in the tuning sensitivity as the etalon is moved. Mode competition is minimized by maintaining the temperature of the etalon 3 at its temperature of maximum efficiency at the wavelength that it is tuned to select. On/off switching operation is enabled by electrodes 12 located on opposite sides of the nonlinear crystal 1. Losses are minimized from the opposite end faces of the nonlinear crystal 1 and the gain crystal 4 by the application of a high reflective coating 16 at the fundamental laser wavelength, and from the two end faces of the etalon 3 by a partial reflective coating 15 at the selected wavelength. There is an anti-reflective coating 14 on the end faces, which face each other, of the gain crystal 4 and nonlinear crystal 1 to further reduce losses in output power. Thus a single axial mode, single wavelength laser beam is produced at a high efficiency, so that up to 100 Watts output power is achieved with low noise of less than 1%, in one example.

The gain crystal 4 has an end face cross sectional area of at least 25 square microns and at most 9 square mm. The separation between the gain crystal 4 and the at least one nonlinear crystal 1 is at most 10 mm. The single chip substrate 2 for all the laser components allows efficient mass production of this laser/amplifier system. The pumping diode laser 7 is preferably an AlGaP laser. Excellent examples of gain crystals 4 are Nd:YAG, and Nd:YVO$_4$. The etalon 3 is preferably made of a substrate chosen from fused silica, and optical glass. The etalon moving means 13 is preferably a screw and bolt attached to one end and a spring attached to the other end of the etalon 3. The moving means 13 is made of an inert metal chosen from the groups of stainless steel, titanium, and platinum, for example.

A method of generating a single axial mode, single wavelength laser light is presented consisting of the steps of: pumping a laser gain crystal 4 by at least one pumping diode laser 1; generating and amplifying a fundamental laser light in a cavity between the highly reflectively coated end face of the gain crystal 4 and the partially reflectively coated opposite end face of the gain crystal 4. The step of amplification of the laser light also occurs between the end face of a gain crystal 4 facing the diode laser and the end face of a nonlinear crystal 1 distal to the diode laser 7, such that both of these end faces are coated with a highly reflective coating 16 at the fundamental laser wavelength. The step of single axial mode, single wavelength selection is done by adjusting the position and therefore the thickness, measured along the direction of laser light transmission, of a moveable wedge shaped etalon 3 that may have a curvature on one of its end faces, by a moving means 13. The motion of the etalon 3 is at an angle with respect to the laser beam transmission direction. Efficiency is maximized by controlling the temperature of the etalon 3, the nonlinear crystal 1, and the gain crystal 4 independently of each other at their respective temperatures of maximum lasing efficiency for the selected wavelength. This eliminates mode competition. Thermoelectric coolers 5 and sensors 10 for each of the above laser components are used to stabilize the temperatures at the optimum levels. The diode laser 7 is separately maintained at its optimum operating temperature by its own thermoelectric cooler 5. Excess heat is removed from the metal substrate 2 by a liquid coolant circulating system 17 which is activated by a sensor 10 in the substrate 2. The method of switching is by activation of electrodes 12 on opposite sides of the nonlinear crystal 1.

Figure 3:
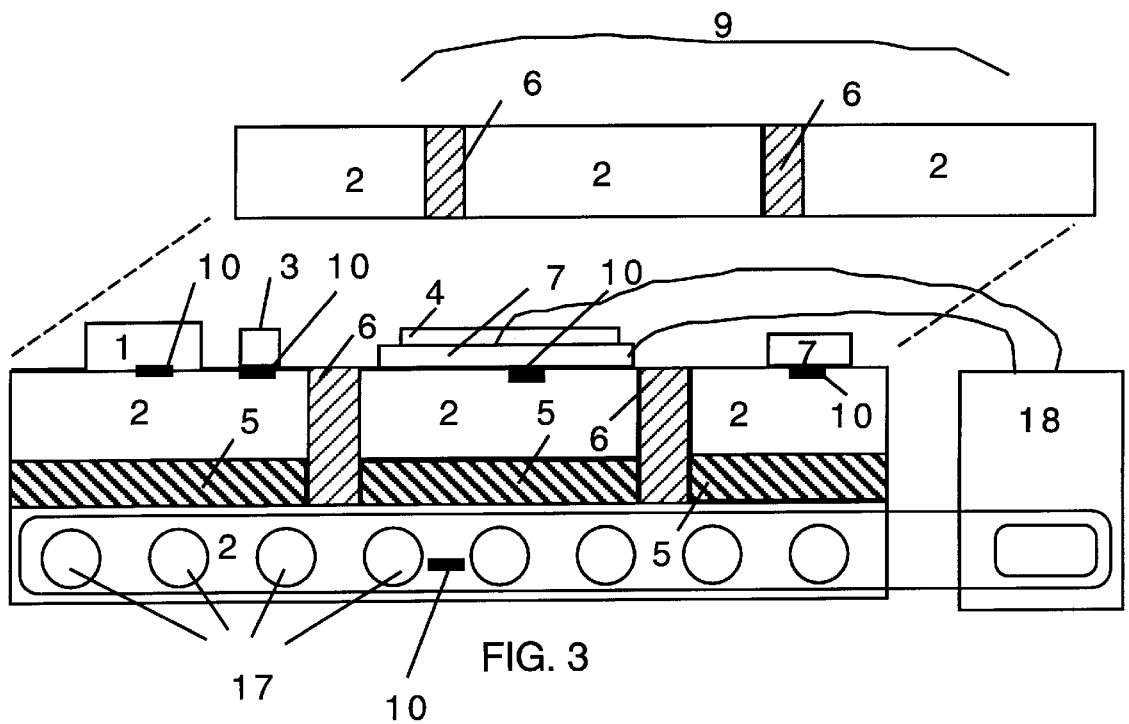
FIG. 3 is a cross sectional view of a micro-laser/amplifier chip having two nonlinear wavelength control crystals on either side of the laser gain crystal with the lid shown above it.
Figure 4:
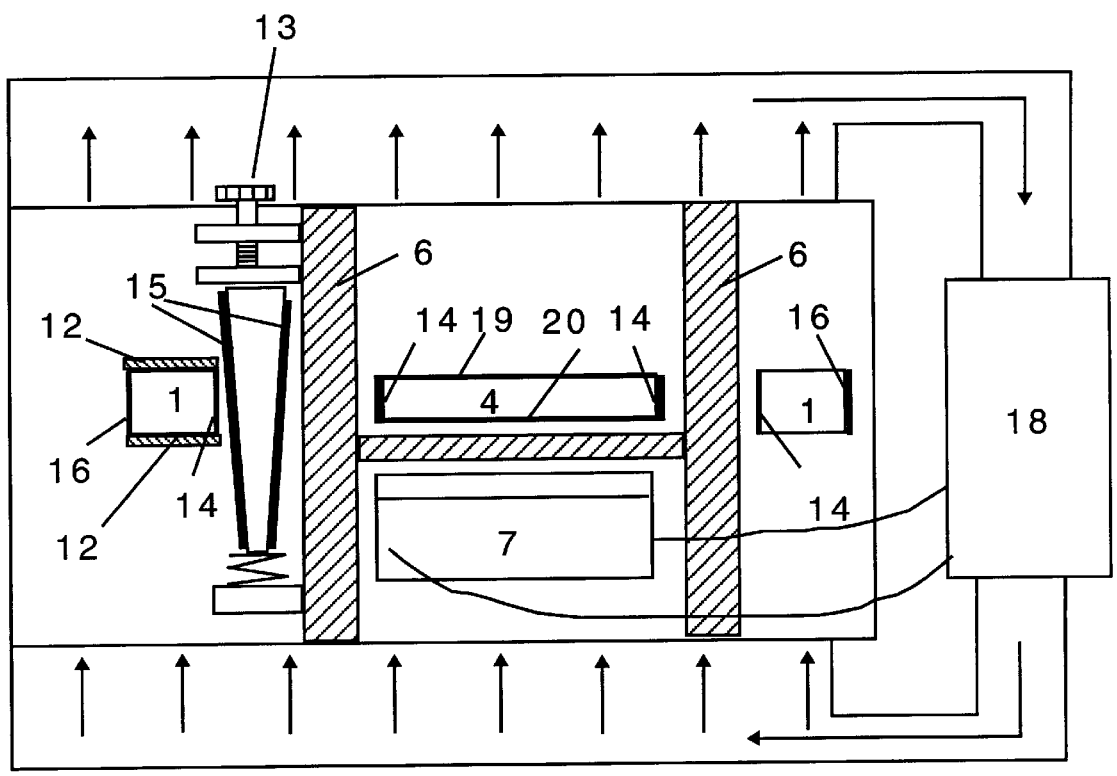
FIG. 4 is a top view of the chip shown in FIG. 3 showing the various laser components mounted on a metal substrate, and indicating the direction of movement of the moveable etalon and the coolant by arrows.

FIGS. 3 and 4 show another configuration of the laser/amplifier system in which there are two nonlinear crystals I on opposite sides of the laser gain crystal 4.

Figure 5:
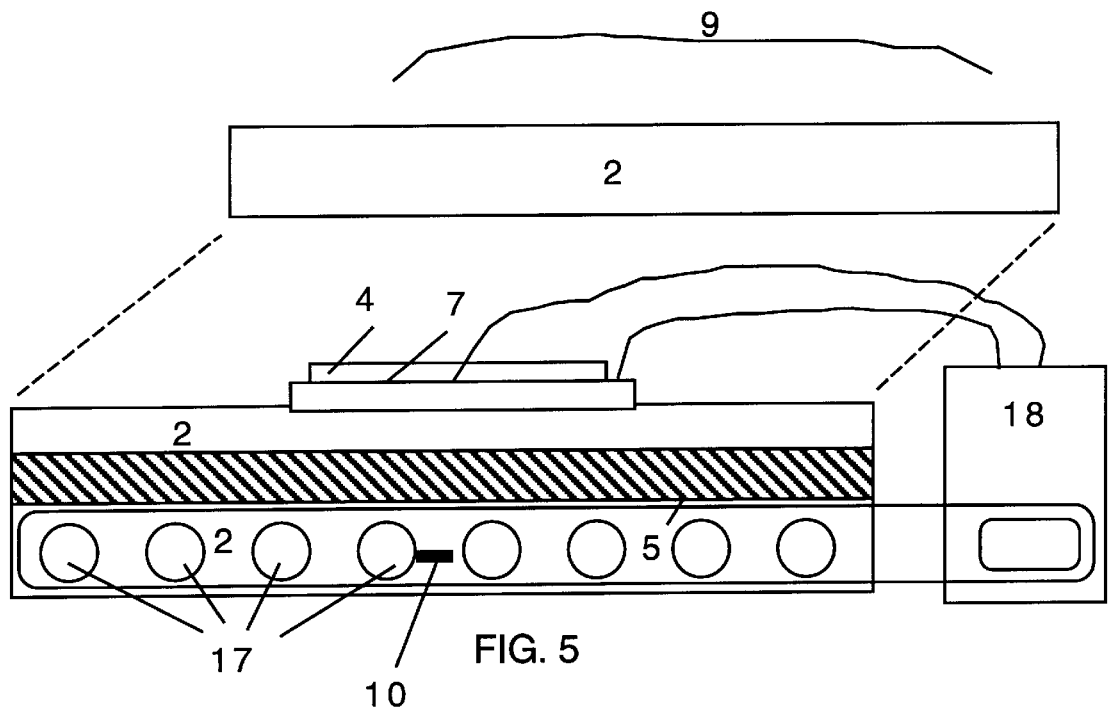
FIG. 5 is a cross sectional view of a micro-laser/amplifier chip in the amplification configuration with the lid shown above it.
Figure 6:
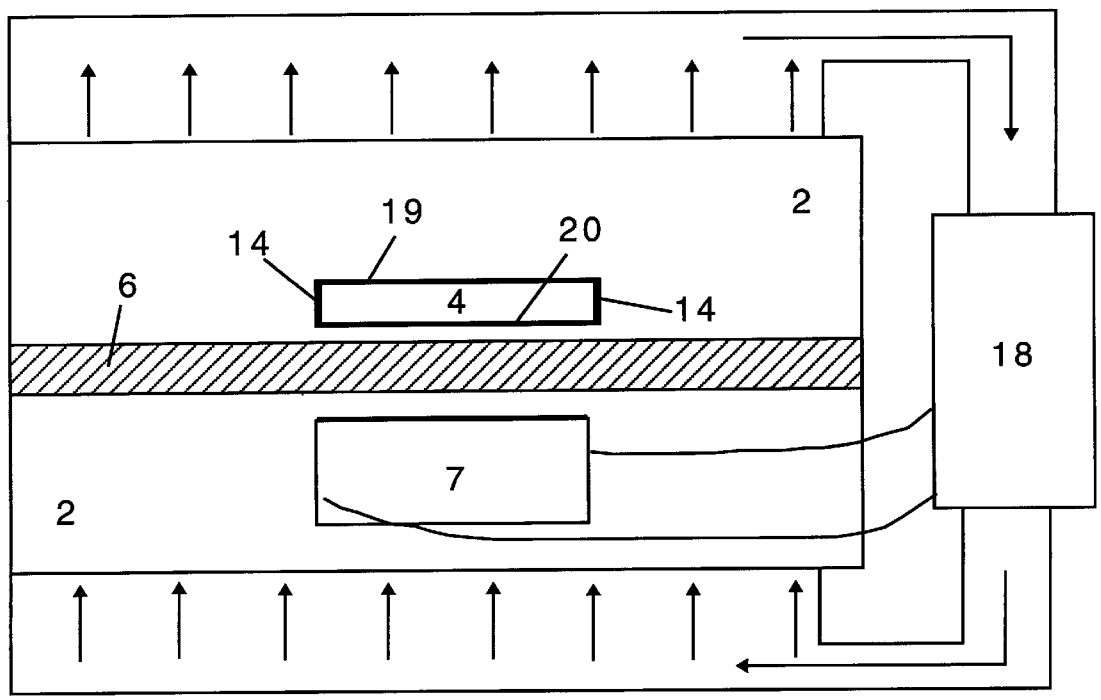
FIG. 6 is a top view of the chip shown in FIG. 5 indicating the direction of movement of the coolant by arrows.

FIGS. 5 and 6 show the laser/amplifier system in the amplification mode. At least one gain crystal 4 and at least one pumping diode laser 7 are mounted upon the metal substrate 2. The metal substrate contains a liquid coolant circulation system 17 that is activated by a sensor in the substrate 2 when the substrate temperature exceeds a predetermined value. The gain crystal 4 has an anti-reflective coating 20 at the diode laser wavelength on the end face facing toward the diode laser 7. The gain crystal 4 also has a high reflective coating 19 at the diode wavelength on the side facing away from the diode laser 7. On the other two sides of the gain crystal 4 there is an anti-reflective coating 14 at the wavelength of the laser light from an external source which is amplified by this laser/amplifier system. The gain crystal 4 has an end cross sectional area of at most 100 square mm. The diode laser 7 and the gain crystal 4 are thermally isolated from each other by a trough filled with a thermally insulative material 6 which is interposed between them in the metal substrate. The metal substrate is made of a material selected from the group of silicon carbide reinforced aluminum, and iron-nickel alloy. The substrate 2 is coated with a highly thermally conductive coating and made of a substance selected from the group of diamond, aluminum oxide, and gold. The laser beam from an external source is passed through the gain crystal 4 and pumped by the diode laser 7 from the perpendicular direction. The amplified beam is then passed through another identical system to further amplify the power. This step is repeated until the desired power level is achieved.

The specially shaped, moveable etalon, the separate, independent thermoelectric coolers for each laser medium, the special conductive coating, and the unique, single chip metal substrate are all novel features of the invention. However, the instant invention is also the particular combination of these features in a single unit construction of the chip. It is this combination that provides dramatically improved operating efficiency, reduced noise, high mass production efficiency, and superior long-term, heavy-duty reliability. Accordingly, for all these reasons set fourth, it is seen that the solid state laser/amplifier chip of the present invention represents a significant advancement in the art of solid state lasers and has substantial commercial merit.

While there is shown and described herein certain specific structure embodying the invention, it will be manifest to those skilled in the art that modifications may be made without departing from the spirit and scope of the underling inventive concept. The present invention shall not be limited to the particular forms herein shown and described, except by the scope of the appended claims.

What is claimed is:

1. A solid state amplification laser chip comprising:
   a solid state laser gain crystal; at least one pumping diode laser, a moveable etalon such that the thickness of said etalon changes along an optical transmission direction as said etalon is moved by a moving means; at least two thermoelectric coolers and at least two temperature sensors, a first thermoelectric cooler and a first temperature sensor both being in thermal contact with said gain crystal, a second thermoelectric cooler and a second temperature sensor both being in thermal contact with said pumping diode laser, an optical transmission thickness of said etalon being adjustable to select for a single wavelength single axial mode laser light, a temperature being controlled in said gain crystal to that temperature at which optimum lasing efficiency occurs for the selected wavelength, and a temperature of said pumping diode laser being controlled independently from the temperature of said gain crystal to that temperature at which optimum lasing efficiency occurs for a pumping laser wavelength; a single metal substrate to which said pumping diode laser, said gain crystal, said etalon, said first cooler and said second cooler are affixed, said diode laser being separated and thermally isolated from said gain crystal by a first trough in said substrate, said gain crystal being separated and thermally isolated from said etalon by a second trough in said substrate, said first trough and said second trough both being filled with a thermally insulative material, said substrate being cooled by a coolant that is circulated through said substrate, said laser gain crystal having an end face cross sectional area of at most 9 square mm.

2. The laser chip according to claim 1 wherein there is included at least one nonlinear crystal affixed to said metal substrate for wavelength conversion, and the separation distance between said gain crystal and said nonlinear crystal is at most 10 mm.

3. The laser chip according to claim 1 wherein said etalon is in thermal contact with a fourth thermoelectric cooler and a fourth temperature sensor, and the temperature of said etalon is controlled independently from said gain crystal and from said diode laser.

4. The laser chip according to claim 1 wherein said metal substrate includes a liquid coolant that is circulated through said substrate by a circulation system which is activated by a sensor located in said substrate when the temperature in said substrate exceeds a chosen value, said chip is sealed by a lid having a third trough contacting said first trough and a fourth trough contacting said second trough.

5. The laser chip according to claim 1 wherein the principle material of said metal substrate is one selected from the group of silicon carbide reinforced aluminum, and iron-nickel alloy, said metal substrate is coated with a material selected from the group of diamond, aluminum oxide, and gold.

6. The laser chip according to claim 1 wherein said etalon is wedge shaped, the end faces of said etalon are at an angle with respect to each other.

7. The laser chip according to claim 1 wherein said etalon has at least one optically transmissive end face that has a curvature.

8. The laser chip according to claim 2 wherein at least two electrodes are attached to opposite sides of said at least one nonlinear crystal for on and off switching operation.

9. The laser chip according to claim 2 wherein said laser gain crystal has an end face cross sectional area of at most 5 square mm, and the separation distance between said gain crystal and said nonlinear crystal is at most 5 mm.

10. The laser chip according to claim 2 wherein the end face of said gain crystal facing said at least one diode laser and the end face of said nonlinear crystal facing away from said gain crystal are both coated with a high reflection coating which is highly reflective at the fundamental wavelength, and the end face of said gain crystal facing toward said nonlinear crystal and the end face of said nonlinear crystal facing toward said gain crystal are both coated with an anti-reflective coating which is transparent at the fundamental wavelength.

11. The laser chip according to claim 2 wherein said at least one nonlinear crystal and said etalon are in thermal contact with a third thermoelectric cooler and with a third temperature sensor, and the temperature of said nonlinear crystal and said etalon are controlled independently from said nonlinear crystal.

12. The laser chip according to claim 6 wherein said etalon has at least one optically transmissive end face that has a curvature.

13. A method for generating a single axial mode laser beam consisting of the steps of: pumping a laser gain crystal with at least one diode laser; generating a fundamental wavelength laser light and amplifying said light in a cavity between a first end face of said laser gain crystal that has a highly reflective coating at the fundamental wavelength and that faces toward said diode laser and a partially reflectively coated end face of said gain crystal that faces away from said diode laser; independently controlling the temperature of said gain crystal and said diode laser to that temperature at which optimum lasing efficiency occurs by thermally contacting said diode laser with a first thermoelectric cooler and a first temperature sensor and by thermally contacting said gain crystal with a second thermoelectric cooler and a second temperature sensor; thermally isolating said diode laser from said laser gain crystal by a first trough filled with a thermally insulative material located in a single substrate to which all laser components are affixed; cooling said substrate by circulating a coolant through said substrate.

14. The method according to claim 13 wherein the step of amplifying said light occurs between said first end face of said laser gain crystal and a nonlinear crystal end face that is placed distal to said diode laser, such that both end faces are coated with a coating that is highly reflective at the fundamental wavelength, a single axial mode wavelength is selected by the step of adjusting a thickness in a direction of laser light transmission of a moveable etalon by moving said etalon by a moving means in a direction at an angle to a laser beam transmission direction, said etalon is coated on both end faces by an anti-reflection coating, a step of on and off switching is enabled by electrodes placed on opposite sides of said nonlinear crystal, independently controlling a temperature of said nonlinear crystal and said etalon from a temperature of said gain crystal by thermally contacting said nonlinear crystal and said etalon with a third thermoelectric cooler and a third temperature sensor and adjusting the temperature of said nonlinear crystal to that temperature at which maximum lasing efficiency occurs for the selected wavelength, said gain crystal and said etalon are thermally isolated from each other by the interposition of a thermally insulative material within a second trough in said substrate, said substrate is cooled by a liquid coolant that is circulated through said substrate by a circulation system that is activated by a sensor in said substrate when the temperature of said substrate exceeds a chosen value.

15. The method according to claim 14 wherein said etalon is formed to have at least one curved optically transmissive end face.

16. The method according to claim 14 wherein said etalon is formed to be wedge shaped such that the planes corresponding to the optically transmissive end faces intersect each other.

17. The method according to claim 16 wherein said etalon has a curvature in at least one optically transmissive end face.

18. A solid state laser amplification chip comprising:
at least one pumping diode laser; at least one laser gain crystal coated on an end face facing toward said diode laser with an anti-reflective coating at a pumping laser wavelength, and an end face facing away from said diode laser of said gain crystal having a highly reflective coating at the wavelength of said diode laser; a first thermoelectric cooler and a first sensor in thermal contact with said at least one diode laser; a second thermoelectric cooler and a second sensor in thermal contact with said gain crystal, a temperature of said gain crystal being maintained at a temperature at which maximum lasing efficiency occurs for a wavelength of laser light being amplified, the temperature of said gain crystal being controlled independently from the temperature of said diode laser; a single metal substrate to which said at least one diode laser, said first thermoelectric cooler, said second thermoelectric cooler, said first sensor, said second sensor, and said gain crystal are mounted; said substrate having a trough filled with a thermal insulator located between said at least one pumping diode laser and said laser gain crystal to thermally isolate said gain crystal from said diode laser, said laser gain crystal having an end face cross sectional area of at most 100 square mm, said substrate being cooled by a coolant that is circulated through said substrate, said chip is sealed by a lid containing a second trough that contacts said trough.

19. The chip according to claim 18 wherein said substrate contains a liquid coolant circulation system activated by a sensor in said substrate when the temperature in said substrate exceeds a chosen value, said substrate is made from a material chosen from the group of silicon carbide reinforced aluminum, and iron-nickel alloy, said substrate is coated with a material chosen from the group of diamond, aluminum oxide, and gold.

20. The chip according to claim 18 wherein said gain crystal has anti-reflection coatings on the sides adjacent to said end faces which are transmissive to the wavelength of the laser light from an external source which is amplified, and said laser gain crystal has an end face cross sectional area of at most 5 square mm.

* * * * *